United States Patent [19]
Ishiwata

[11] Patent Number: 5,379,593
[45] Date of Patent: Jan. 10, 1995

[54] LIQUID PRESSURE SOURCE UNIT FOR LIQUID-OPERATED BOOSTER

[75] Inventor: Ichiro Ishiwata, Yokosuka, Japan
[73] Assignee: Nabco Limited, Hyogo, Japan
[21] Appl. No.: 143,454
[22] Filed: Oct. 26, 1993

[30] Foreign Application Priority Data

Nov. 9, 1992 [JP] Japan .................... 4-324801
Dec. 12, 1992 [JP] Japan .................... 4-353237

[51] Int. Cl.⁶ .................... F16D 31/02; B60T 13/00
[52] U.S. Cl. .................... 60/413; 60/547.1
[58] Field of Search ............ 60/413, 547.1, 542, 60/543, 597.2, 560, 581, 468, 494; 91/376 R

[56] References Cited

U.S. PATENT DOCUMENTS

| | | | |
|---|---|---|---|
| 4,338,855 | 7/1982 | Ideta | 60/547.1 X |
| 4,660,381 | 4/1987 | Kuromitu | 60/581 X |
| 4,819,433 | 4/1989 | Belart | 60/547.1 |
| 4,850,655 | 7/1989 | Takata et al. | 60/547.1 X |
| 4,914,917 | 4/1990 | Schonlan | 60/547.1 X |
| 5,020,864 | 6/1991 | Tanaka | |

FOREIGN PATENT DOCUMENTS

| | | | |
|---|---|---|---|
| 722520 | 11/1965 | Canada | 60/547.1 |
| 0407721 | 7/1990 | European Pat. Off. | |
| 3133111 | 4/1983 | Germany | |
| 3215954 | 11/1983 | Germany | 60/547.1 |
| 2193770 | 2/1988 | United Kingdom | |
| 2242948 | 10/1991 | United Kingdom | |
| 717410 | 2/1980 | U.S.S.R. | 60/560 |

Primary Examiner—Edward K. Look
Assistant Examiner—Hoang Nguyen
Attorney, Agent, or Firm—Kane, Dalsimer, Sullivan, Kurucz, Levy, Eisele & Richard

[57] ABSTRACT

This invention not only positively reduces the vibrations and noises due to pulsation pressure generated by a hydraulic pressure pump 10, but also effectively prevents the generation of foreign sounds that may occur when a liquid-operated booster 90 is abruptly activated. For this purpose, a throttle valve unit 80 (180, 280) for greatly reducing the flow area until the pressure differential or flow rate reaches a predetermined value is provided between an accumulator 70 for accumulating pressurized liquid and the liquid-operated booster 90 which utilizes the pressurized liquid as an operation source. When the pressure accumulated within the accumulator 70 is at a predetermined value or less, the throttling function of the throttle valve unit 80 (180, 280) is cancelled.

9 Claims, 6 Drawing Sheets

LIQUID PRESSURE SOURCE UNIT FOR LIQUID-OPERATED BOOSTER

BACKGROUND OF THE INVENTION

This invention relates to a liquid pressure source unit which is to be mounted on a brake system of a vehicle, etc., and particularly to a liquid pressure source unit of the type which includes a throttle valve unit for damping pulsation pressure and operated to supply power pressure to a liquid-operated booster.

In general, a liquid pressure source unit of this type comprises a hydraulic pressure pump actuated by an external power and adapted to draw hydraulic liquid and discharge the same, and an accumulator arranged in such a manner as to accumulate the pressurized liquid discharged from the pump in a predetermined range of pressure and supplies such accumulated pressurized liquid to a liquid-operated brake circuit. In this liquid pressure source unit, the pressurized liquid discharged from the hydraulic pressure pump is liable to generate pulsation, which gives rise to the problem of vibrations and noises. This problem is more significant in a reciprocal type pump for reciprocating a plunger using an eccentric cam than in a radial piston type pump in which a piston disposed within a rotor is reciprocally moved in a radial direction of the rotor by rotating the rotor relative to an eccentric stator. The pulsation pressure also affects adversely to the accumulator for accumulating the pressurized liquid discharged from the pump and even to a liquid-operated booster which utilizes the pressurized liquid of the accumulator, thereby reducing their tolerance. The pulsation is even further transmitted to a brake pedal in the brake circuit to adversely affect the driver's feel of operation with respect to the pedal.

In view of the above, Japanese Laid-Open Utility Model Application No. Hei 3-129785 discloses a technique for reducing vibrations and noises due to pulsation pressure by providing a pulsation damping device which includes a pressure receiving member which under the influence of the pressure discharged by a reciprocal type pump is moved toward an outlet port of the pump against the force of a spring. The technique for providing an elastic pressure receiving member at an outlet port of a pump is also known from U.S. Pat. No. 5,096,400. Another U.S. Pat. No. 4,988,147 discloses a technique for providing an accumulation chamber and a fixed throttle having a constant throttling function at an outlet port of a pump. The diameter of the fixed throttle is, for example, 1 mm or less. Taking the load of the pump into consideration, the diameter of the fixed throttle is 0.1 mm order (normally 00.5 mm, for example). Incidentally, the liquid-operated booster itself is well known from, for example, U.S. Pat. No. 5,168,791 and some others. Those techniques for reducing such pulsation pressure are good enough for reducing vibrations and noises of the system including the hydraulic pressure pump, the accumulator, and the liquid-operated booster, and are also effective in enhancing the tolerance of the devices.

However, a new problem of a foreign sound has been closed up at a stage where the pulsation pressure has been reduced. This foreign sound is liable to occur to the inside of the liquid-operated booster, particularly at the time the liquid-operated booster is abruptly actuated (for example, at the time the brake pedal is abruptly actuated). Incidentally, it is considered that this foreign sound is generated by the pressurized liquid which flows, all on a sudden, into a servo chamber of the liquid-operated booster causing the flow rate at the valve portion to become extremely fast. This foreign sound, different from the above-mentioned large vibrations and noises, seems to draw the driver's keen attention. That is, this foreign sound is a big problem for the driver, etc. and needs to be solved separately from the noises and vibrations due to the pressurized liquid. This foreign sound occurs not only in the reciprocal type pump but also in the radial piston type pump which generates less vibrations and noises.

SUMMARY OF THE INVENTION

It is an object of the present invention to provide a technique capable of effectively preventing a generation of a foreign sound which cannot be solved by the conventional techniques for reducing the pulsation pressure, particularly, the foreign sound which will be generated when a liquid-operated booster is abruptly actuated.

In order to achieve this object, according to the present invention, there is provided a throttle valve unit capable of greatly reducing the flow area until a pressure differential or flow rate reaches a predetermined value, between an accumulator adapted to accumulate pressurized liquid and a liquid-operated booster which utilizes the pressurized liquid as an operation source.

This throttle valve unit functions as such that when the liquid-operated booster is abruptly actuated, the flow of the pressurized liquid from the accumulator toward the liquid-operated booster is slightly delayed, so that the flow rate at the valve portion of the booster will be restrained. As a result, a foreign sound, which would otherwise be generated by a large flow rate, is not generated.

Another object of the present invention is to provide a technique capable of smoothly performing a deaerating operation, etc. in spite of a provision of a throttle valve unit for damping the pulsation pressure.

In order to achieve this object, according to the present invention, there is employed a cancellation means for cancelling a throttling function of the throttle valve unit when the pressurized liquid accumulated within the accumulator drops to a level equal to or lower than the lowest pressure of the predetermined range of pressure.

As the cancellation means, there is a method for forming a first state for forming a throttle and a second state for forming no throttle by providing a piston, which receives pressure from the accumulator, to the throttle valve unit itself and utilizing the movements or strokes of the piston, or a method (i.e., gas containing type) in which the accumulator itself is divided, by a piston, into an accumulation chamber and a pre-load chamber and the above-mentioned two states are realized by utilizing the movements or strokes of the piston within the accumulator.

When the deaerating or deoiling operation is performed, the throttle valve unit forms a state (cancellation state) where the throttle value unit does not form a throttle because no pressurized liquid is accumulated in the accumulator, and therefore, the throttle valve does not effect adversely to the deaerating or deoiling operation.

DETAILED DESCRIPTION OF THE PREFERRED EMBODIMENTS

FIRST EMBODIMENT

Figure 1:
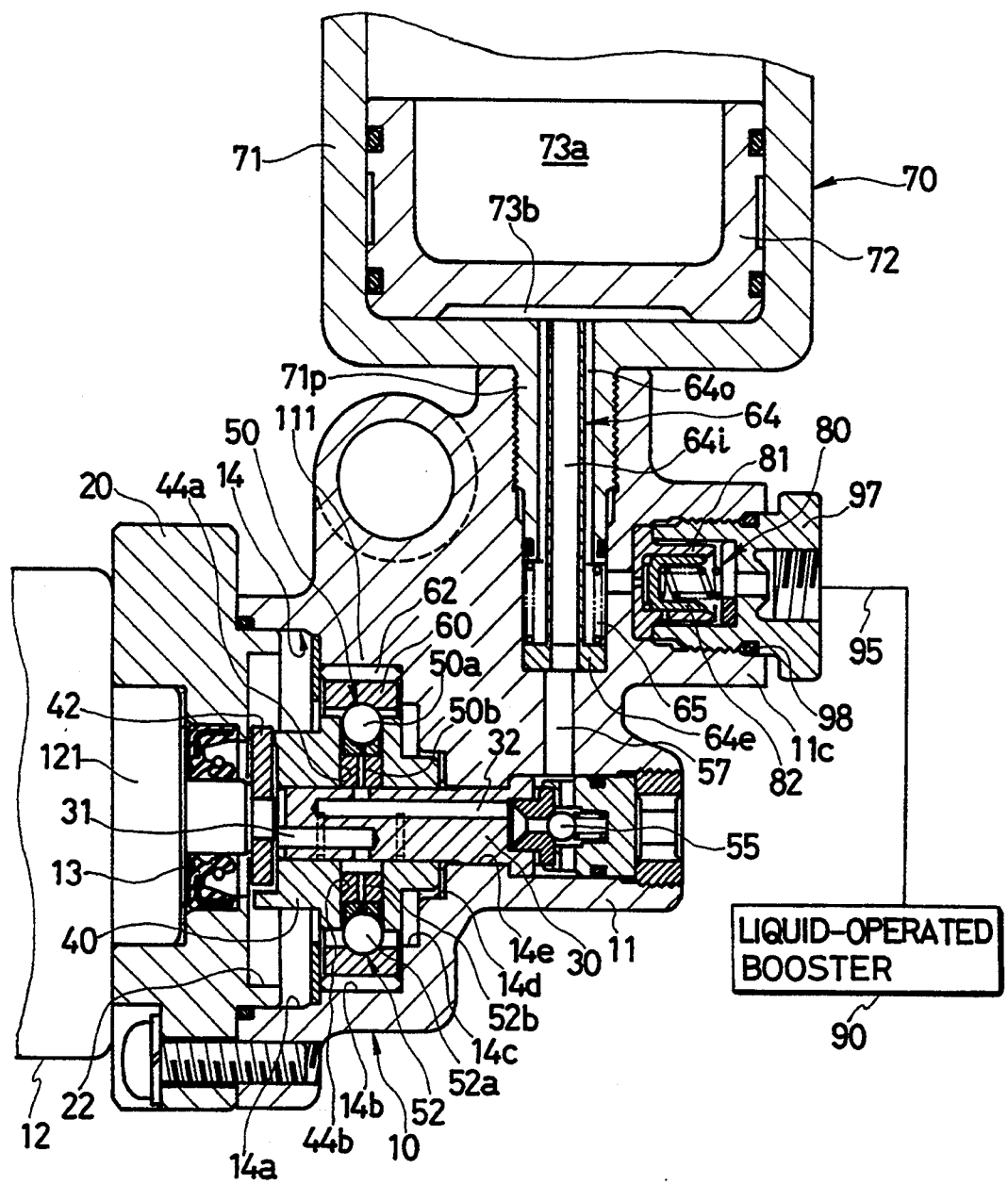
FIG. 1 is a sectional view showing an overall image of a first embodiment of a liquid pressure source unit according to the present invention.

FIG. 1 is a sectional view of an overall construction of a pressure source unit of the present invention, showing various component parts of a radial piston type pump adjacent to a motor, and an accumulator integral with the pump. An important portion of the pump 10 is present within a recess 14 of a housing 11. An electric drive motor 12 acting as a power source is situated at a side portion of the housing 11 with a closure member 20 disposed therebetween. In view of a relation with the housing 11, the closure member 20 has such a function as to close an open end of the recess 14. On the other hand, in view of a relation with the electric drive motor 12, the member 20 has such a function as to retain an oil seal ring 13 which is mounted around a drive shaft 121 in order to seal the peripheral area of the drive shaft. In order to achieve a light-weight, the housing 11 is made of aluminum or aluminum-contained alloy.

The recess 14 of the housing 11 is a stepped-bore having five steps. A first bore 14a on the open end side has a largest diameter, and a second bore 14b, a third bore 14c, a fourth bore 14d and a fifth bore 14e are steppingly reduced in diameter in this order. A central shaft 30 is fixedly supported within the fifth bore 14e of the recess 14. One end of the central shaft 30 is disposed within the fifth bore 14e, while the other end thereof extends so far as to the first bore 14a side. A rotor 40 is supported by that portion of the central shaft 30 projecting from the fifth bore 14e.

The rotor 40 is connected to the drive shaft 121 of the electric drive motor 12 through an elastic coupling 42. Thus, the rotor 20 rotates about the central shaft 30 in accordance with the rotation of the drive shaft 121. The rotor 40 has cylinder bores 44a and 44b extending radially in such a manner as to cross an axis thereof. Ball pistons 50 and 52 are provided respectively to the interiors of the cylinder bores 44a and 44b. The ball pistons 50 and 52 include balls 50a and 52a, and piston members 50b and 52b of two-piece structure, respectively. The balls 50a and 52a disposed at an outer side are in contact with an inner periphery of a guide ring 60 surrounding the rotor 40. The guide ring 60, together with a roller 62 on the outer periphery of the guide ring 60 and a housing portion 111 forming the second bore 14b of the recess 14, constitutes a bearing. Here, the housing portion 111 functioning as a stator is in eccentric relation to the central shaft 30. Thus, the guide ring 60 is also in eccentric relation to the central shaft 30 and causes the ball pistons 50 and 52 to reciprocate radially in accordance with the rotation of the rotor 40. The two ball pistons 50 and 52 are spaced 180° from each other in the circumferential direction of the rotor 40. One of the ball pistons 50 is in a radially inwardly compressed position (position where a compressing stroke is now finished), while the other ball piston 52 is in a radially outwardly expanded position (position where the compressing stroke is to start). In these respective positions, the inner sides of the ball pistons 50 and 52 are in communication respectively with first and second passages 31 and 32 provided to the central shaft 30.

In the pump 10, a route from the inlet side to the outlet side will be reviewed here. An inlet port, not shown, is provided to the housing 11 in such a manner as to communicate with the interior of the first bore 14a of the recess 14. The liquid entered into the first bore 14a through the inlet port flows into the first passage 31 formed within the central shaft 20 via a recess 22 formed in an end face of the closure member 20. The liquid flowed into the first passage 31 is compressed by pumping actions of the respective ball pistons 50 and 52. The compressed fluid passes through the second passage 32, a check valve 55 at one end of the central shaft 30, a passage 57 within the housing 11, and the interior of a tubular member 64, and then finally reaches an accumulator 70.

As for the type of the accumulator for accumulating the pressurized liquid discharged by the pump 10, it is preferable to use a bladder type or a piston type which is suitable for making a small size. Here, the piston type accumulator 70 is employed and integrally formed with the housing 11 of the pump 10. The piston type accumulator 70 is designed such that the inside of a cylindrical casing 71 is divided into two chambers 73a and 73b by a piston 72, one of the chambers 73a being served as a gas chamber and the other chamber 73b, as an accumulation chamber. The accumulator 70 is provided with a mounting tubular portion 71p at the center of a bottom part of the casing 71, and connected to the housing 11 side using a screw on the outer periphery of the tubular portion 71p. Therefore, an inlet and an outlet with respect to the accumulator 70 are provided to the interior of the same tubular portion 71p. For this purpose, a tubular member 64 having a slightly reduced diameter is provided to the inside of the tubular portion 71p, so that a space 64i at the inner periphery of the tubular member 64 may be defined as an inlet passage with respect to the accumulator 70 and a space 64o at the outer periphery of the tubular member 64 may be defined as an outlet passage. If the inlet passage 64i and the output passage 64o with respect to the accumulation chamber 73b of the accumulator 73 are divided in this way, the pressurized liquid discharged from the pump 10 can be positively moved to the liquid-operated booster 90 side via the accumulation chamber 73b of the accumulator 70, thereby enabling for the accumulator 70 to more effectively exhibit a buffer function. The tubular member 64 is positioned within the tubular portion 71p by a weak spring 65 retained by a flange portion 64e, acting as a spring retainer, at one end of the tubular member 64.

In the illustrated liquid pressure source unit including the pump 10, the accumulator 70, and the liquid-operated booster 90, the tubular member 64 is disposed at the inlet/outlet portion of the accumulator 70. Owing to this arrangement, the accumulator 70 exhibits an effective buffer function and the pulsation in the discharge pressure from the pump 10 side is greatly damped. Therefore, the pulsation damping device (if this should be applied to the illustrated one, it could be provided to the casing portion of a check valve 55) disclosed in the above-mentioned Japanese Laid Open Utility Model Application No. Hei 3-129785, is not always necessary. However, by such pulsation damping device and accumulator 70, the pulsation of high frequency (particularly, pulsation having a component of frequency of about several kHz) is not damped to the extent able to receive full satisfaction. There is a possibility that the remaining pulsation causes a piping 95 (for example, a tube, a high pressure hose, or the like) for connecting the accumulator 70 side and the liquid-operated booster 90 to be vibrated, and the vibrations are transmitted to a brake pedal through the liquid-operated booster 90.

Taking the remaining pulsation into consideration, in the illustrated example, a throttle valve unit 80 is disposed between the outlet of the accumulator 70 and a coupling 97 for the piping 95. It is not preferable to provide the throttle valve unit 80 having a severe throttling function between the pump 10 and the accumulator 70 because loads applied to the pump 10 is increased.

Next, the throttle valve unit 80 will be described with reference to FIG. 2.

The coupling 97 for the piping 95 is threadedly engaged with the connection area 11c on the housing 11 side and retains a seal ring 98. A piston case 81 is disposed within the connection area 11c on the inner side of the foremost end of the coupling 97. A generally glass-shaped piston 82 is disposed within the piston case 81. Under the influence of the force of the spring 83, the piston 82, this being a movable member, is normally brought into abutment with a bottom portion of the piston case 81 at its head portion where a notched passage 84 is present. The force of the spring 83 is set higher than the pulsation pressure. For example, if the pulsation pressure is 0.45 kg/cm$^2$, a valve opening pressure (i.e., pressure for canceling the throttling function) is set generally equal to or more than that. However, the larger the valve opening pressure is set, the more the actuation of the liquid-operated booster 90 is delayed. Therefore, it is preferable that the valve opening pressure of the throttle valve unit 80 is set slightly higher than the pulsation pressure. On the other hand, the pulsation pressure attributable to the operation of the pump 10 is in a corresponding relation with the change in quantity of the liquid (or flow rate) discharged from the pump 10. Therefore, in other words, the throttling function of the throttle valve unit 80 may be canceled when more liquid than that discharged by a single stroke of the pump 10 flows to the liquid-operated booster 90 side. A resin plate 85 with a slit 85s functions as a spring retainer for retaining one end of the spring 83 and also as a cushion member for the piston 82.

Figure 2:
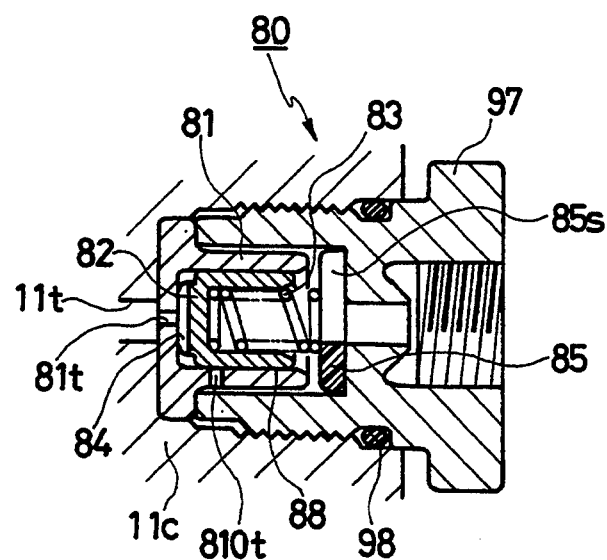
FIG. 2 is a sectional view showing one example of a throttle valve unit of FIG. 1.

When the liquid-operated booster 90 adjacent to the piping 95 is abruptly actuated or the like, the throttle valve 80 thus constructed is in a position of FIG. 2 and effects the prescribed throttling function until the pressure differential or flow rate between the accumulator 70 side and the liquid-operated booster 90 reaches a predetermined value. More specifically, the pressurized liquid within the accumulation chamber 73b of the accumulator 70 reaches the inside of the piston case 81 via the outlet passage 64o at the outer periphery of the tubular member 64, a through-hole 11t formed in the housing 11, and then via a through-hole 81t formed in the bottom portion of the piston case 81. However, the piston 82 blocks a communication hole 810t at one side of the piston case 81. Because of this, it is the only permissible way for the pressurized liquid to pass a tiny gap 88 formed between an outer periphery of the piston 82 and an inner periphery of the piston case 81 in order to flow toward the piping 95 side. This tiny gap 88 has a throttling function equivalent to a tiny hole or aperture having a diameter of 0.01 mm order (for example, a tiny hole or aperture having a diameter of approximately 0.05 mm). However, when the pressure differential or flow rate reaches a predetermined value, the piston 82 moves toward the resin plate 85 side to open the communication hole 810t. The communication hole 810t communicates the interior of the piston case 81 with a sufficiently large passage formed between the outer periphery of the piston case 81 and the inner periphery of the coupling 97. In this way, when the liquid-operated booster 90 is abruptly activated, the throttle valve unit 80 slightly delays the flow of the pressurized liquid from the accumulator 70 to the liquid-operated booster 90 by the throttling function for the first increment of time, and restrains the flow rate at the valve portion of the booster 90. Moreover, this throttling function, which is exhibited by the throttle valve unit 80, is also very effective for preventing the remaining pulsation.

Figure 3:
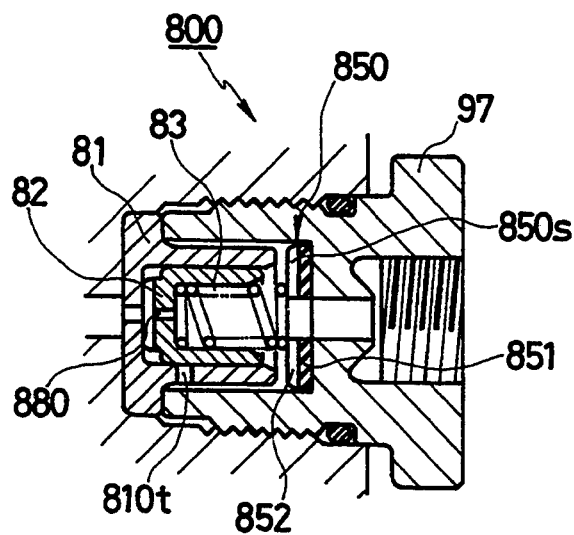
FIG. 3 is a sectional view showing another example of a throttle valve unit of FIG. 1.

FIG. 3 shows another example of a throttle valve unit 800 having a tiny hole or aperture of a diameter of approximately 0.05 mm as a throttle. In the throttle valve unit 800 shown in FIG. 3, a tiny hole or aperture 880 formed in the piston 82 is employed as a throttle, and a ring member 850 with a slit 850s, which is formed of a rubber 851 and a metal piece 852 integrally molded, is employed as a spring retainer for retaining one end of the spring 83. All the remaining construction of the throttle valve unit 800 is the same as that of FIG. 2, and therefore the operation thereof is likewise the same.

As in the illustrated embodiment, if the accumulator 70 is formed integrally with the housing 11 and the throttle valve 80 (800) is mounted at the coupling 97 portion, the system can be made simple in structure and the piping 95 can effectively be prevented from being vibrated by pulsation pressure.

SECOND EMBODIMENT

Figure 4:
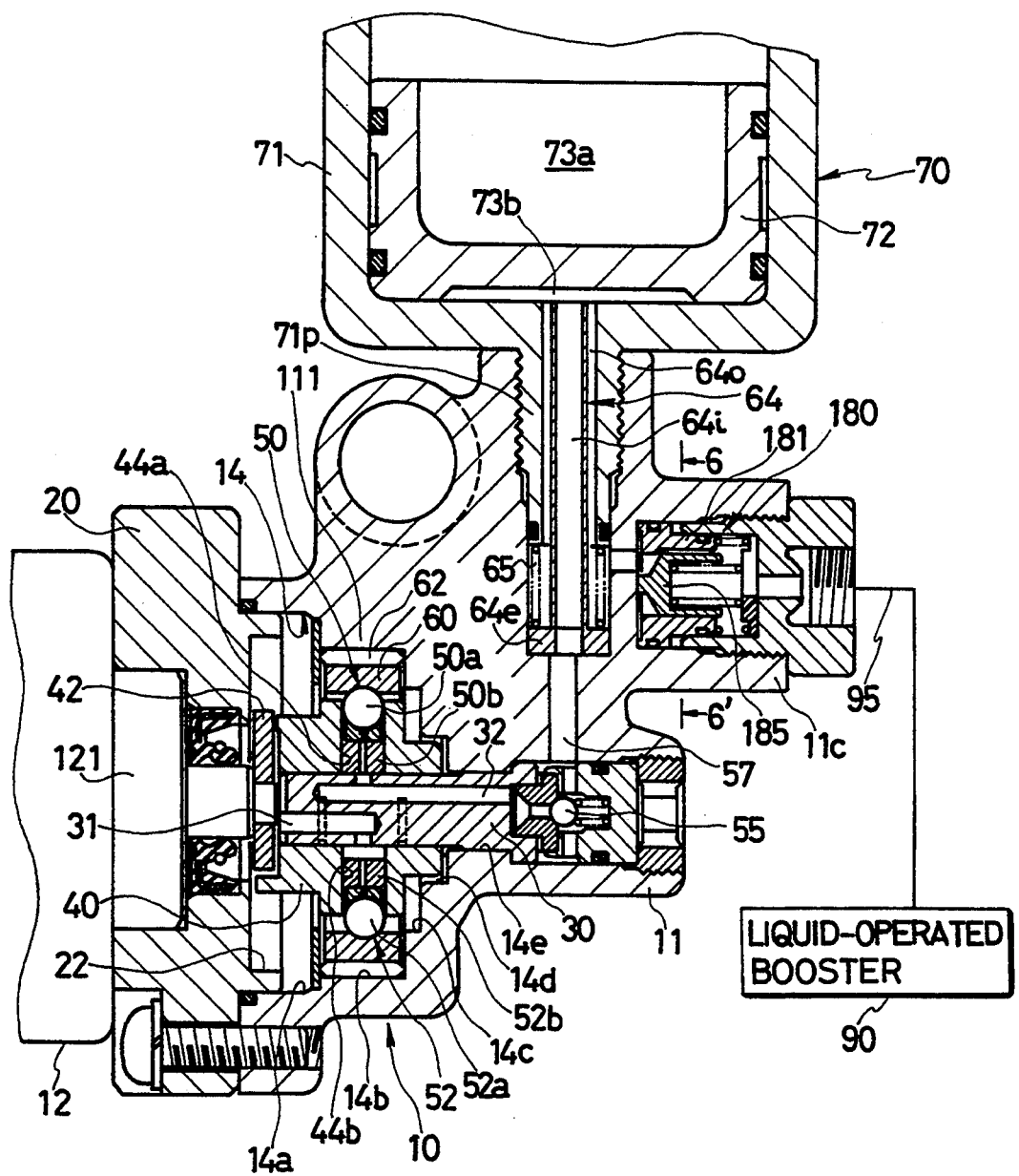
FIG. 4 is a sectional view, similar to FIG. 1, showing a second embodiment of a liquid pressure source unit according to the present invention.

FIG. 4, like FIG. 1, depicts the overall construction of the liquid pressure source unit, showing the positional relationship among its component parts. Since many parts of the second embodiment shown in FIG. 4 are identical with those of FIG. 1, the identical parts are denoted by identical reference numerals, respectively, and description thereof is omitted.

As will be apparent from the description to follow, in this second embodiment, there is employed a cancellation means for canceling the throttling function of a throttle valve unit 180 (280) when the pressure accumulated within the accumulator 70 is equal to or below a predetermined value. Consequently, in the second embodiment, the throttle valve unit and the cancellation means related thereto are different from those of the first embodiment. Therefore, these different portions will be described in greater detail.

First Example of the Throttle valve Unit Portion

Figure 5:
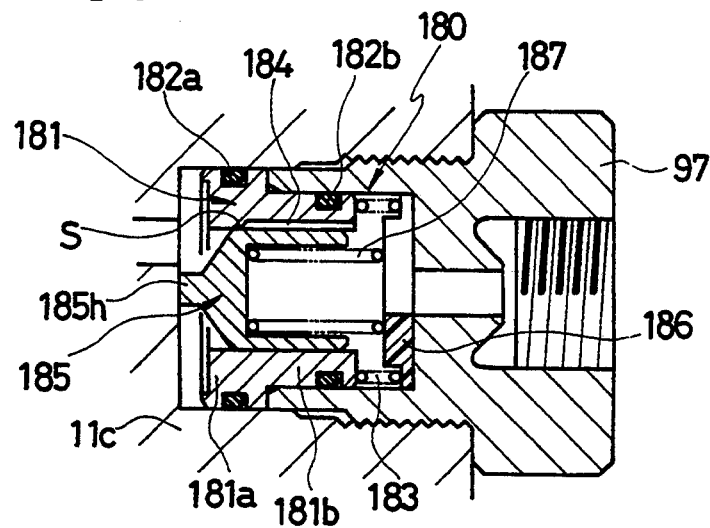
FIG. 5 is a sectional view of a first throttle valve unit portion of FIG. 4 but now in a different operating position.

With reference to FIG. 5 showing an operating state, as well as FIG. 4 showing the overall construction of the throttle valve unit, a first example of the throttle valve unit 180 will be described. The coupling 97 for the piping 95 is threadedly engaged with the connection area 11c of the housing 11 side. A stepped piston 181 is disposed within the connection area 11c on the inner side of the foremost end of the coupling 97. The first piston 181 has an enlarged diameter portion 181a and a reduced diameter portion 181b. Seal rings 182a and 182b are retained respectively on the outer periphery of the enlarged and reduced diameter portions 181a and 181b. The enlarged diameter portion 181a is fitted into an internal bore of the connection area 11c, while the reduced diameter portion 181b is fitted to an inner periphery of the coupling 97. When the pressure is not accumulated within the accumulator 70 and therefore the throttle valve unit 180 is in a non-operating condition, one end of the large diameter portion 181a of the first piston 181 is in abutment with the bottom portion of the connection area 11c under the influence of the force of the spring 183 (FIG. 4). As the pressure is increasingly accumulated within the accumulator 70, the first piston 180 can move toward the piping 95 side because force generated owing to difference in pressure receiving area between the enlarged diameter portion 181a and the reduced diameter portion 181b overcomes the force of the spring 183 (FIG. 5).

Figure 6:
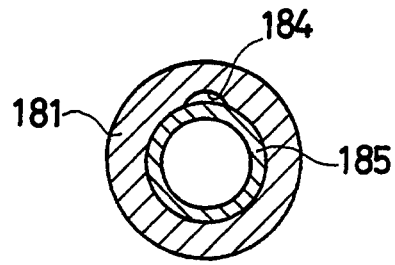
FIG. 6 is a sectional view taken on line 6–6' of FIG. 4, when viewed in a direction as shown by arrows.

An axially extending groove 184 is formed in the inner periphery of the first piston 181, and a second piston 185 is disposed within a bore defined by the inner periphery where the groove 184 is formed (also see FIG. 6). The second piston 185 is urged against the bottom portion of the connection area 11c by another spring 187 which serves a resin plate 186 as a spring retainer for retaining one end of the spring 187 as in the case with the above-mentioned spring 183, such that a head portion 185h having a reduced diameter is in abutment with the bottom portion of the connection area 11c. As a consequence, the first and second pistons 181 and 185 are, in mutual cooperation, capable of forming a first state where a throttle between the two pistons 181 and 185 is canceled as shown in FIG. 4, and a second state where a throttle S is formed between the two pistons 181 and 185 as shown in FIG. 5. For example, there can be realized the states in that the throttle is canceled by sealingly contained gas pressure of 40 kgf/cm$^2$ for pre-load, and the throttle S is effectively maintained by gas pressure higher than that. Since the throttle is canceled when the aforementioned deaeration or deoil operation is to be operated, these operations can be effected without any adverse affection from the throttling function. On the other hand, when pressure is increasingly accumulated within the accumulator 70 thereafter, the throttle S becomes effective, and the effective throttling function is maintained until the pressure differential or flow rate between the accumulator 70 side and the liquid-operated booster 90 side reaches a predetermined value. This is effective for reducing the afore-mentioned foreign sound and pulsation.

Second Example of the Throttle Valve Portion

Figure 7:
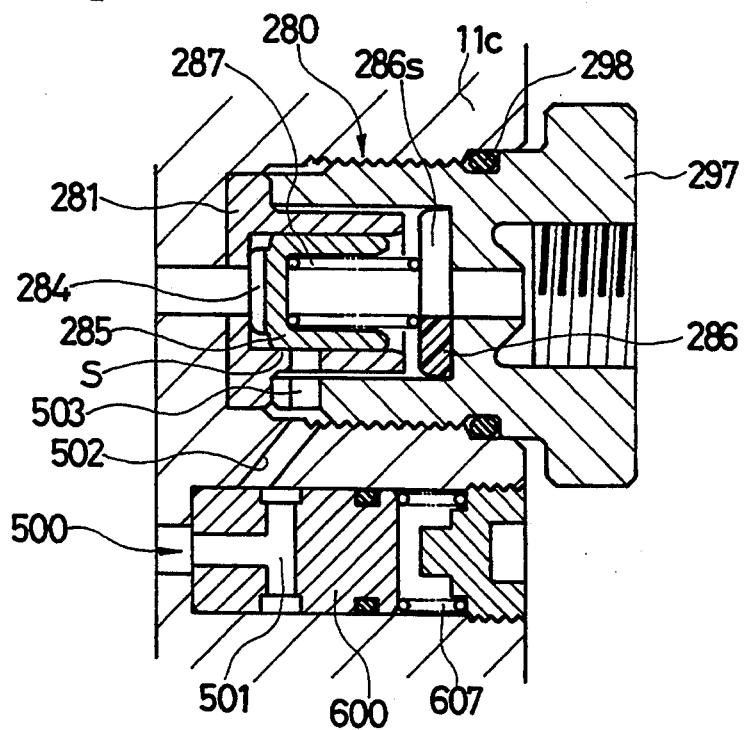
FIG. 7 is a sectional view showing a second example of a throttle valve unit portion.

As shown in FIG. 7, in this second example, there are employed, in parallel relation to a throttle valve unit 280, a communication passage (bypass passage) 500 for use of a bypass having a larger flow area than a throttle passage of the throttle valve unit 280, and an opening/closing piston 600 for opening and closing the bypass passage 500. In the throttle valve unit 280, a coupling 297 for the piping 95 is threadedly engaged with the connection area 11c of the housing 11 side and retains a seal ring 298. Within the connection area 11c, a piston case 281 is disposed at an inner side of a foremost end of the coupling 297. A movable glass-like piston 285 is disposed within the piston case 281. Under the influence of the force of a spring 287, the movable piston 285 is normally brought into abutment with a bottom portion of the piston case 281 at its head portion where a notched passage 284 is present. The force of the spring 287 is set higher than the pulsation pressure. A resin plate 286 with a slit 286s functions as a spring retainer for retaining one end of the spring 287 and also as a cushion member for the piston 285.

In the throttle valve unit 280 thus constructed, a tiny gap formed between the outer periphery of the piston 285 and the inner periphery of the piston case 281 forms a throttle S. Aside from a passage formed by this throttle S, the bypass passage 500 communicates an inlet side of the throttle valve unit 280 with an outlet side thereof (i.e., the accumulator 70 side with the coupling 297 side). The bypass passage 500 includes, in addition to a T-shaped passage 501 formed within the opening/closing piston 600, a slant passage 502 for communicating one side where the opening/closing piston 600 is present with another side where the throttle valve unit 280 is present, and a through-hole 503 formed in the coupling 297. Under the influence of the force of the spring 607, the opening/closing piston 600 ensures or permits a communication between the T-shaped passage 501 and the slant passage 502 until the pressure value accumulated within the accumulator 70 reaches a pre-load value. However, when a larger pressure than the pre-load value is accumulated within the accumulator 70, the force generated by the pressurized liquid owing to the pressure accumulated within the accumulator 70 overcomes the force of the spring 607. As a result, the opening/closing piston 600 is moved to cut off the communication between the T-shaped passage 501 and the slant passage 502. As a consequence, the throttling function owing to the throttle S becomes ineffective until a predetermined pressure is accumulated within the accumulator 70. By virtue of this arrangement, a smooth operation of the afore-mentioned deaeration or deoil is ensured.

Third Example of the Throttle Valve Unit Portion

Figure 8:
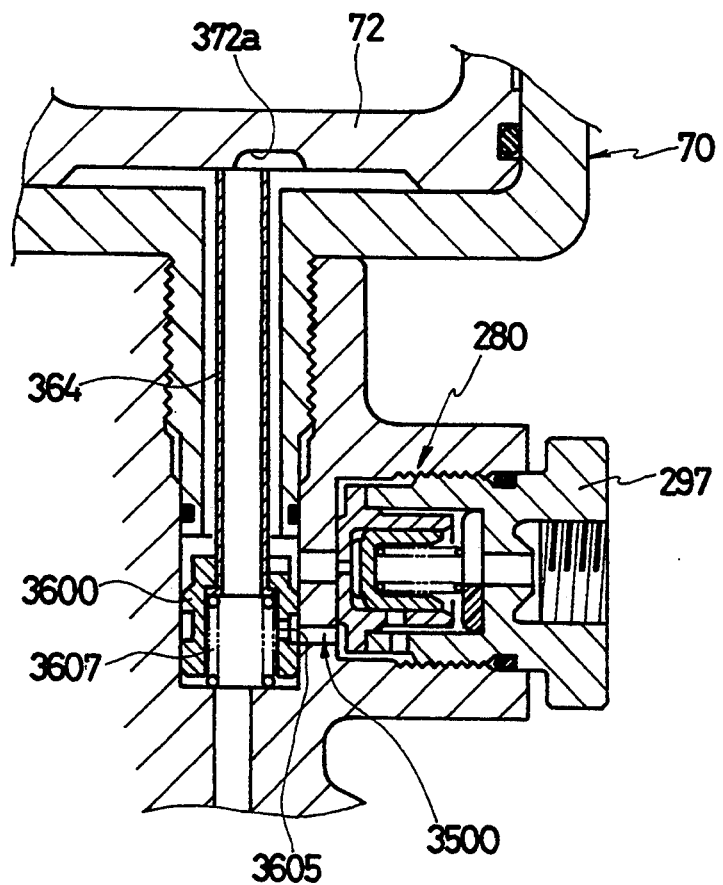
FIG. 8 is a sectional view showing a third example of a throttle valve unit portion.
Figure 9:
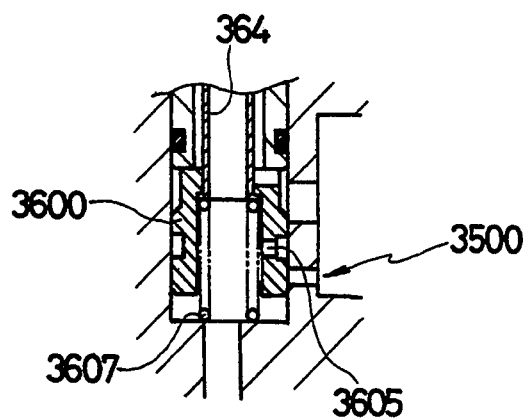
FIG. 9 is a sectional view of the example of FIG. 8 but now in a different operating position.

As shown in FIGS. 8 and 9, in this third example, a means for opening and closing a bypass passage 3500 has a different construction from that of the second example while the same throttle valve unit as that of the second example is used. More specifically, a spring-loaded sleeve-shaped member 3600 is disposed at a lower end portion of a tubular member 364 which is disposed at the inlet/outlet portion of the accumulator 70. Under the effect of the spring 4607, the sleeve-like member 3600 is moved in unison with the tubular member 364. Also, under the effect of the same spring 3607, the tubular member 364 is moved in unison with the piston 72 of the accumulator 70. As a result, the sleeve-like member 3600 moves in accordance with the movement of the piston 72 of the accumulator 70. The sleeve-like member 3600 has a communication hole 3605 for communicating the inside with the outside. By way of this communication hole 3605 as well as the bypass passage 3500, the inlet side of the throttle valve unit 280 can communicate with the outlet side thereof. However, when pressure is increasingly accumulated within the accumulator 70 and the piston 72 is moved, the sleeve-like member 3600 cuts off the communication between the communication hole 3605 and the bypass passage 3500 in response to the movement of the piston 72. In this third example, owing to a provision of the sleeve-like member 3600 and the spring 3607, in order to ensure the inlet and outlet of the pressurized liquid to and from the accumulator 70, a notch 372a is formed in that surface of the piston 72 where the tubular member 364 contacts.

Fourth Example of the Throttle Valve

Figure 10:
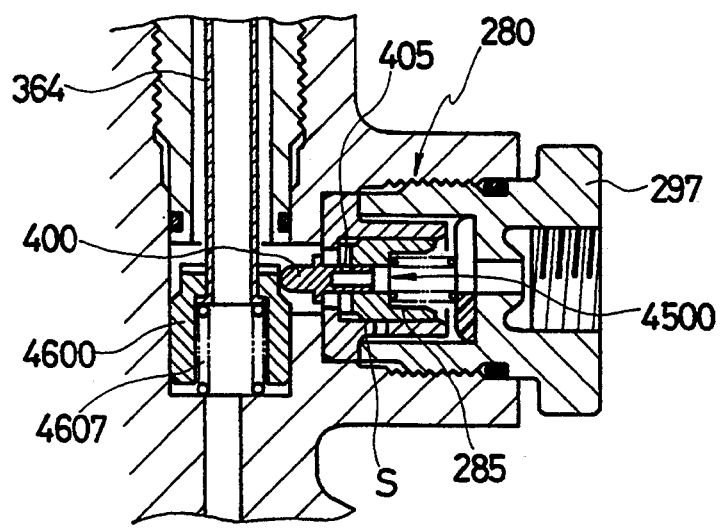
FIG. 10 is a sectional view showing a fourth example of a throttle valve unit portion.
Figure 11:
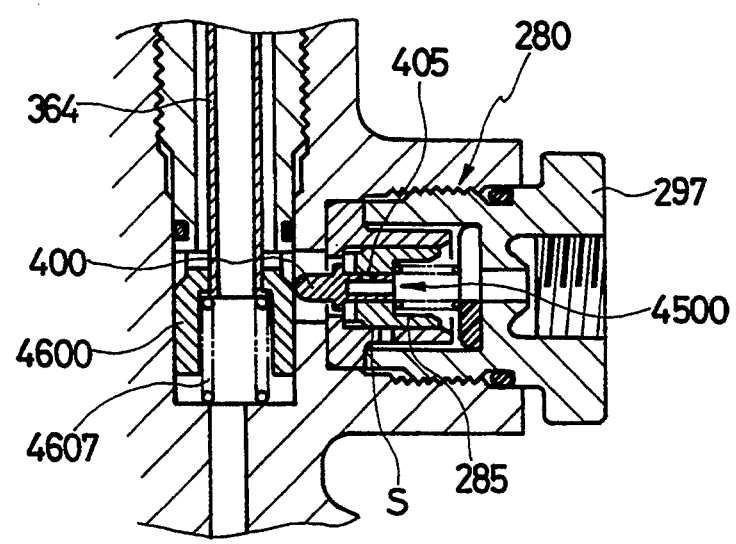
FIG. 11 is a sectional view of the example of FIG. 10, but now in a different operating position.

As shown in FIGS. 10 and 11, in this fourth example, a means for opening and closing a bypass passage 4500 has a different construction from those of the second and third examples while the same throttle valve unit as those of the second and third examples are used. The opening/closing means of the fourth example is the same as the third example in the respect that it is operated in accordance with the stroke of the piston 72 of the accumulator 70. In this fourth example, the bypass passage 4500 is disposed at the inside of the throttle valve unit 280, and a bypass rod 400 is disposed at a head portion of the throttle valve unit 280. In the bypass rod 400, a communication hole 405 portion formed therein constitutes a part of the bypass passage 4500, and the bypass passage 4500 is opened and closed by the movement of bypass rod 400 itself. A sleeve-like member 4600 is provided at a lower end of the tubular member 364 at the inlet/outlet portion of the accumulator 70. The sleeve-like member 4600 is moved in unison with the tubular member 364 under the effect of a spring 3607 loaded in the member 4600. Also, the sleeve-like member 4600 is moved in accordance with the stroke of the piston 72 of the accumulator 70. This sleeve-like member 4600 functions as a cam relative to the bypass passage 400. When the pressure is not accumulated within the accumulator 70, the sleeve-like member 4600 and the bypass rod 400 are in positions shown in FIG. 10, respectively. As a result, the communication hole 405 and the bypass passage 4500 are open. Therefore, the throttling function owing to the throttle S of the throttle valve unit 280 is not effective. However, when pressure is increasingly accumulated within the accumulator 70 and the pressure value accumulated reaches a pre-load value, or a predetermined value exceeding an alarm pressure which exceeds the pre-load value [the predetermined value exists somewhere between the alarm pressure (for example, 65 kgf/cm$^2$) of the accumulator 70 and the lower limit pressure (for example, 90 kgf/cm$^2$)], the bypass rod 400 is moved in accordance with the stroke of the piston 72 to close the communication hole 405 and also to close the bypass passage 4500 as shown in FIG. 11. As a result, the throttle S becomes effective and the throttle valve unit 280 exhibits its function for reducing the pulsation, etc. In order for the bypass rod 400 not to be drawn toward the throttle valve unit 280 side during a vacuum bleeding operation, a sliding resistance of the bypass rod 400 is preferably set somewhat large relative to the piston 285 within the throttle valve unit 280.

What is claimed is:

1. In a liquid pressure source unit for a liquid-operated booster comprising a hydraulic pressure pump actuated by an external power and adapted to draw hydraulic liquid and discharge pressurized liquid, an accumulator for accumulating the pressurized liquid discharged from said hydraulic pressure pump, the pressurized liquid accumulated in said accumulator being supplied to said liquid-operated booster, the improvement comprising a throttle valve unit provided between said accumulator and said liquid-operated booster and adapted to greatly reduce a flow area until a pressure differential or a flow rate reaches a predetermined value, said throttle valve unit having a throttling function equivalent to a tiny hole of 0.01 mm order in diameter, said throttle valve unit having a member that moves between a first position forming a throttle having a very small flow area in accordance with change in pressure differential or flow rate, and a second position for cancelling the throttle, the throttle valve unit operating to prevent a foreign sound which will be generated when a liquid-operated booster is abruptly actuated, said accumulator having means for preventing pulsation generated by said hydraulic pressure pump.

2. A liquid pressure source unit for a liquid-operated booster according to claim 1, in which said accumulator is integral with said hydraulic pressure pump and connected to said liquid-operated booster through piping, and said throttle valve unit is provided on that side of said piping offset to said accumulator.

3. A liquid pressure source unit for a liquid-operated booster according to claim 1, further comprising a tubular member disposed at an inlet portion of said accumulator into which the pressurized liquid from said hydraulic pressure pump flows, a space within said inlet portion being divided, by said tubular member, into an inner space defined by an inner periphery of said tubular member and an outer space defined by an outer periphery of said tubular member, one of said inner and outer spaces being served as an inlet passage into said accumulator and the other of said inner and outer spaces being served as an outlet passage from said accumulator to said liquid-operated booster.

4. A liquid pressure source unit for a liquid-operated booster according to claim 3, in which said inner space is served as said inlet passage and said outer space is served as said outlet passage.

5. A liquid pressure source unit for a liquid-operated booster according to claim 2, in which said throttle valve unit is disposed within said piping at an area of connection of said piping.

6. A liquid pressure source unit for a liquid-operated booster as claimed in claim 5, in which said throttle valve unit comprises a piston case disposed within said area of connection, a piston movable within said piston case, and a spring for biasing said piston.

7. A liquid pressure source unit for a liquid-operated booster as claimed in claim 1, in which said accumulator is capable of accumulating the pressurized liquid discharged from said hydraulic pressure pump in a predetermined pressure range, and which further comprises cancellation means for cancelling a throttling function of said throttle valve unit when the pressurized liquid accumulated within said accumulator drops to a level equal to or lower than the lowest pressure of said predetermined range of pressure.

8. A liquid pressure source unit for a liquid-operated booster as claimed in claim 7, in which said cancellation means has a piston which under the influence of pressure from said accumulator, is movable in accordance with change in pressure, and a communication passage for communicating the inlet side of said throttle valve unit with the outlet side thereof with a flow area larger than the flow area of said throttle valve unit, said communication passage being able to open and close in accordance with a movement of said piston.

9. A liquid pressure source unit for a liquid-operated booster as claimed in claim 7, in which said accumulator has a movable wall for dividing a pressure accumulation chamber and a pre-load chamber, and said cancellation means has a movable member operatively connected, in mechanical engagement, to said movable wall, and a communication passage for communicating the inlet side of said throttle valve unit with the outlet side thereof with a flow area larger than the flow area of said throttle valve unit, said communication passage being able to be opened and closed in accordance a movement of said movable member.

* * * * *